(12) United States Patent
    Montel (10) Patent No.: US 10,302,433 B2
(45) Date of Patent: May 28, 2019

(54) DAYTIME AND NIGHTTIME STELLAR SENSOR WITH ACTIVE POLARIZER

(71) Applicant: CENTRE NATIONAL D'ETUDES SPATIALES, Paris (FR)

(72) Inventor: Johan Montel, Toulouse (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 125 days.

(21) Appl. No.: 15/542,691

(22) PCT Filed: Jan. 20, 2016

(86) PCT No.: PCT/EP2016/051146
    § 371 (c)(1),
    (2) Date: Jul. 11, 2017

(87) PCT Pub. No.: WO2016/116511
    PCT Pub. Date: Jul. 28, 2016

(65) Prior Publication Data
    US 2017/0370725 A1    Dec. 28, 2017

(30) Foreign Application Priority Data

Jan. 21, 2015 (FR) ...................... 15 50488

(51) Int. Cl.
    *G01C 17/34*       (2006.01)
    *G01C 21/02*       (2006.01)
    (Continued)

(52) U.S. Cl.
    CPC ........... *G01C 21/025* (2013.01); *G01C 17/34* (2013.01); *G01C 21/165* (2013.01); *G01C 21/18* (2013.01)

(58) Field of Classification Search
    CPC .... G01C 21/025; G01C 17/34; G01C 21/165; G01C 21/18
    See application file for complete search history.

(56) References Cited

U.S. PATENT DOCUMENTS 4,560,279 A * 12/1985 Kouns ...................... G01V 8/02
                                                          356/364
5,206,499 A *  4/1993 Mantravadi ........... G01S 3/7867
                                                          250/203.6
(Continued)

FOREIGN PATENT DOCUMENTS

FR          1159021 A      6/1958
FR          2981149 A1     4/2013

OTHER PUBLICATIONS

International Search Report from Application No. PCT/EP2016/051146, dated Apr. 1, 2016.

*Primary Examiner* — Nicholas Kiswanto
(74) *Attorney, Agent, or Firm* — Burris Law, PLLC (57) ABSTRACT

The invention relates to a daytime and nighttime stellar sensor (1), comprising: at least one video camera (2) suitable for taking images of stars (3) in the sky; and a control unit (4), characterized in that it furthermore comprises: a polarizer (5), the control unit (4) being configured: to obtain an estimation of a direction of polarization of the polarized light received from the sky by the video camera (2); and to control the orientation of the polarizer (5) so that said polarizer (5) filters polarized light from the sky directed toward the video camera (2) and having said polarization direction.

10 Claims, 5 Drawing Sheets

(51) Int. Cl.
*G01C 21/16* (2006.01)
*G01C 21/18* (2006.01)

(56) References Cited

U.S. PATENT DOCUMENTS

| | | | | |
|---|---|---|---|---|
| 6,087,646 | A * | 7/2000 | Didinsky | B64G 1/361 |
| | | | | 244/164 |
| 6,216,983 | B1 * | 4/2001 | Wehner | G01S 5/163 |
| | | | | 244/164 |
| 6,356,815 | B1 * | 3/2002 | Wu | B64G 1/361 |
| | | | | 244/164 |
| 6,490,801 | B1 * | 12/2002 | Hersom | B64G 1/36 |
| | | | | 250/206.2 |
| 7,349,803 | B2 | 3/2008 | Belenkii et al. | |
| 2012/0173143 | A1 * | 7/2012 | Belenkii | G01C 21/02 |
| | | | | 701/513 |
| 2012/0175496 | A1 | 7/2012 | Vorovitchik | |

* cited by examiner

FIG. 6

DAYTIME AND NIGHTTIME STELLAR SENSOR WITH ACTIVE POLARIZER

CROSS REFERENCE TO RELATED APPLICATIONS

The present application is a national phase entry under 35 U.S.C. § 371 of International Application No. PCT/EP2016/051146 filed Jan. 20, 2016, published in French, which claims priority from French Patent Application No. 1550488 filed Jan. 21, 2015, all of which are incorporated herein by reference.

GENERAL TECHNICAL FIELD

The invention relates to a daytime and night time stellar sensor. The invention also relates to a method for measuring the attitude of a vehicle, in particular at low altitude, from measurements of the stellar sensor.

STATE OF THE ART

Stellar sensors are devices giving the possibility of inferring from the taking of star images, the attitude of a vehicle (for example a space vehicle of the satellite type). The identification of the stars in the images, by comparison with a catalogue of known stars, gives the possibility of determining the sought attitude.

In many missions, it is necessary to know the attitude of the aircraft both in the daytime and in the nighttime.

However, the taking of star images is more difficult in the daytime, because of a background noise in the images, in particular resulting from the light emitted by the sun and diffused by the particles of the stratosphere or of the atmosphere.

Diverse solutions have been proposed for ensuring success of the taking of star images in the daytime, from a stellar sensor.

For example, patent FR1159021, of the applicant, describes a daytime stellar sensor, giving the possibility of providing a measurement of attitude both in daytime and in nighttime.

However, at a low altitude (altitude of less than 25 km) and in the daytime, it is difficult to obtain images of stars which may be exploited, given that the number of detectable stars by the sensor decreases with the altitude of the vehicle. Further, perturbations of the measurement (sky background noise) are more significant at low altitude. The significant sky background flux imposes limitation in the integration time (exposure time) which lowers the signal-to-noise ratio and therefore the capability of detecting a sufficient number of stars.

Present solutions are therefore not applicable to the daytime measurement at low altitude.

Moreover, the attitude of a vehicle may also be determined by using an inertial central unit and/or gyrometers.

However, this solution also has drawbacks, and in particular drifts in the measurements caused by drifts in the accelerometers and the gyrometers. Re-settings of the inertial central unit with satellite measurements (GPS/GNSS) are known, but remain vulnerable since they may be scrambled globally or locally.

PRESENTATION OF THE INVENTION

The invention relates to a daytime and nighttime stellar sensor, comprising at least one camera adapted for taking images of stars of the sky, a control unit, characterized in that it further comprises a polarizer, the control unit being configured for obtaining an estimation of a polarization direction of the polarized light from the sky received by the camera, and controlling the orientation of the polarizer so that said polarizer filters the polarized light from the sky directed towards the camera and having said polarization direction.

The invention is advantageously completed with the following characteristics, taken alone or in any of their technically possible combinations:

- the stellar sensor further comprises a light filter, only letting through light in the infrared band;
- the light filter exclusively lets through light having a wavelength comprised between 1.5 μm and 2 μm or between 0.9 μm and 1.4 μm;
- the stellar sensor comprises a device for measuring an angle between a target direction of the stellar sensor and the sun, the control unit being configured for estimating the polarization direction of the polarized light from the sky received by the camera from said angle;
- the control unit comprises a memory storing ephemerides and/or a solar direction model for calculating an angle between a target direction of the sensor and the sun, from which the control unit calculates the polarization direction of the polarized light from the sky received by the camera;
- the stellar sensor comprises a first optical head, comprising a first camera and a first polarizer, and a second optical head, comprising a second camera and a second polarizer, the first optical head and the second optical head being positioned in a diametrically opposite direction in azimuth.

The invention also relates to a device for measuring the attitude of a vehicle, comprising a inertial central unit and/or a gyrometer, for providing an estimation of the attitude of the vehicle, characterized in that the device further comprises a daytime and nighttime stellar sensor as described earlier, a memory storing a catalogue of known stars, the device being configured for resetting the estimation of the attitude of the vehicle provided by the inertial central unit and/or by the gyrometer from images taken by the stellar sensor and from the catalogue of known stars. This resetting may for example be carried out by gyro-stellar hybridization, by using a filter of the Kalman type.

The invention also relates to a vehicle (for example a marine, earth-borne, or space vehicle, comprising propulsion means), characterized in that it comprises this device for measuring attitude.

The invention also relates to a method for taking images of stars in the daytime and nighttime period, applying a daytime and nighttime stellar sensor comprising a camera and a polarizer, characterized in that it comprises steps consisting of controlling the orientation of the polarizer so that said polarizer filters the polarized light from the sky directed towards the camera and having said polarization direction, and takes images of stars of the sky with the camera.

The invention also relates to a method for measuring the attitude of a vehicle, comprising the steps consisting of taking images of stars of the sky according to the method as described earlier, and this exclusively in a wavelength band comprised between 0.9 μm and 2 μm, and comparing the images of the stars with a catalogue of known stars, for resetting an estimation of the attitude of the vehicle when the latter has an altitude comprised between 0 and 25 km.

The invention has many advantages.

The stellar sensor gives the possibility of significantly increasing the signal-to-noise ratio in the taking of star images.

In particular, the stellar sensor gives the possibility of providing utilizable images under difficult shooting conditions, like during the daytime and/or at a low altitude (between 0 and 25 km).

The measurements of the stellar sensor may notably be used for attitude measurement purposes, in particular for resetting attitude measurement devices.

Thus, the resetting may notably be achieved in the daytime and at the low altitude, via the stellar sensor, without having to resort to resetting with satellite navigation systems.

Finally, the proposed solution is inexpensive, flexible, and adapted to different types of vehicles, both marine, earthborne, and space vehicles.

PRESENTATION OF THE FIGURES

Other features, objects and advantages of the invention will become apparent from the following description, which is purely illustrative and non-limiting, and which should be read with reference to the appended drawings wherein.

DETAILED DESCRIPTION

1. Stellar Sensor 1.1 Presentation of the Device

Figure 1:
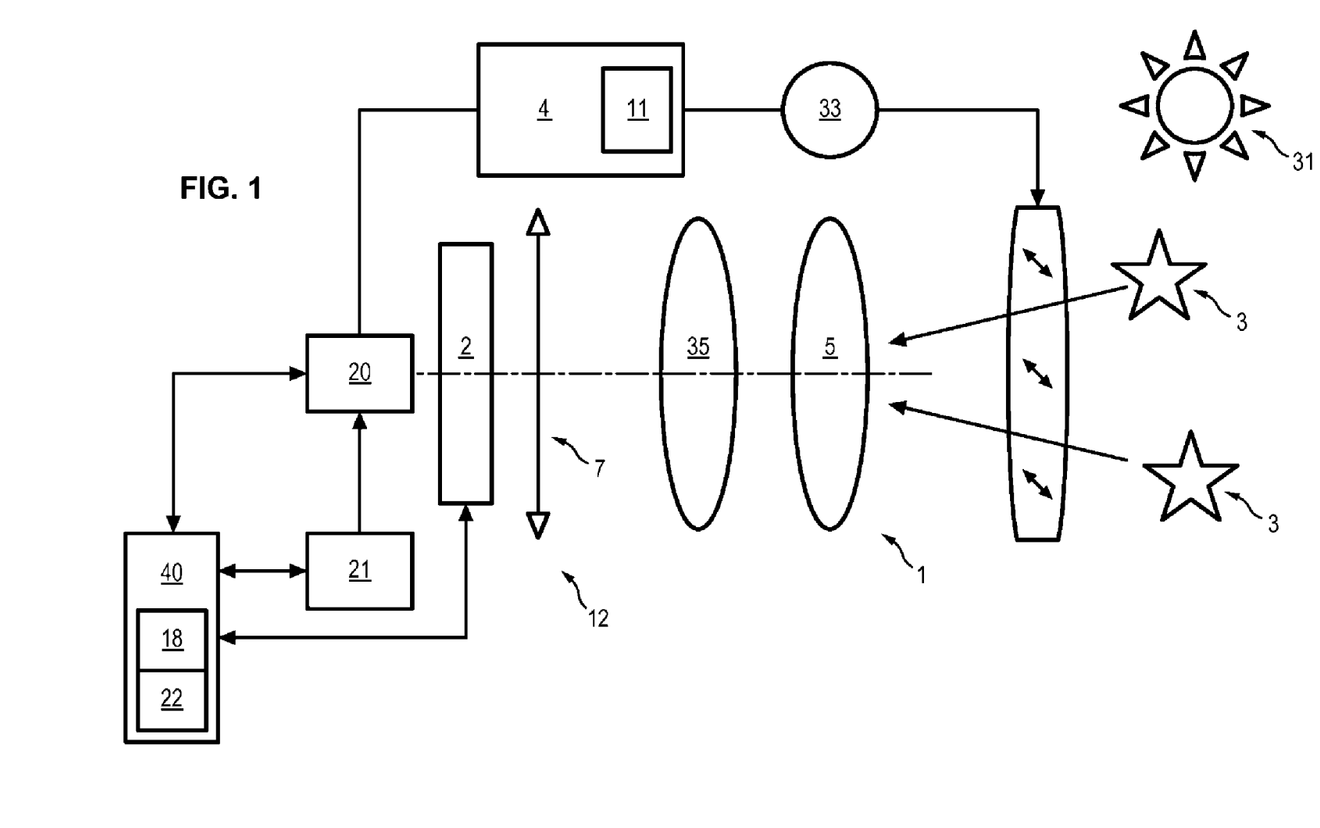
FIG. 1 is an illustration of an embodiment of a stellar sensor, as well as of an attitude measurement device comprising said stellar sensor.

In FIG. 1 an embodiment of a stellar sensor 1 according to the invention has been illustrated.

This stellar sensor 1 is adapted to taking images of stars 3 both during the day and during the night.

The stellar sensor 1 comprises at least one camera 2 adapted for taking images of stars of the sky. As explained subsequently, the type of camera 2 is notably selected according to the wavelength of the light which one seeks to measure. For example, in the field of the near infrared (0.9-1.7 μm), a camera of the InGaAs type may be used.

The camera 2 may also be compliant with the teaching of patent FR1159021 of the applicant.

If necessary, the stellar sensor 1 comprises an objective 35 and an optical filter 7.

The stellar sensor 1 comprises a control unit 4. The control unit 4 for example comprises a processor and a memory 11.

The stellar sensor 1 further comprises a polarizer 5.

A polarizer is a tool which selects in an incident light wave a preferential polarization direction. Therefore, the polarizer filters the light waves which do not have said preferential polarization direction.

It was ascertained that solar light diffused by the atmosphere is partly polarized, linearly. The degree of polarization as well as the angle of polarization (i.e. the polarization direction in space) define the polarization field of the sky. This field is a function of the relative directions of the sun, of the zenith and of the direction aimed by the stellar sensor 1. On the other hand, the light from the stars is not very polarized.

The control unit 4 is configured for obtaining an estimation of a polarization direction of the polarized light from the sky received by the camera 2.

According to an exemplary embodiment, the control unit 4 receives an estimation of the angle between the aiming direction of the stellar sensor 1 and the direction of the sun. The control unit 4 calculates from this angle an estimation of the polarization direction of the polarized light from the sky received by the camera 2.

The angle between a target direction of the stellar sensor 1 and the sun may notably be provided by a measurement device of the stellar sensor 1 or by a measurement device loaded onboard the vehicle bearing said stellar sensor 1.

For example, the control unit 4 receives an estimation of the angle between the target direction of the stellar sensor 1 with the direction of the sun from an inertial central unit 20 and/or from a gyrometer 21 present in the stellar sensor 1, or communicating with said stellar sensor 1.

Alternatively, or additionally, the control unit 4 comprises a memory 11 storing ephemerides and/or a solar direction model, which gives the possibility of providing an estimation of the angle between the target direction of the stellar sensor 1 with the direction of the sun. The solar direction model depends on the date, the time and the position of the vehicle.

In the case when the solar direction is not measured but calculated, the sensor requires having a determination (even very inaccurate) of the date, time (few minutes of errors are acceptable) and of the land-based position (a few tens of kilometers or even hundred kilometers are acceptable).

The calculation of the polarization direction from the angle between the target direction of the stellar sensor 1 and the direction of the sun may be carried out with diverse sky models.

In an exemplary embodiment, the model only considers molecular Rayleigh diffusion.

Figure 2:
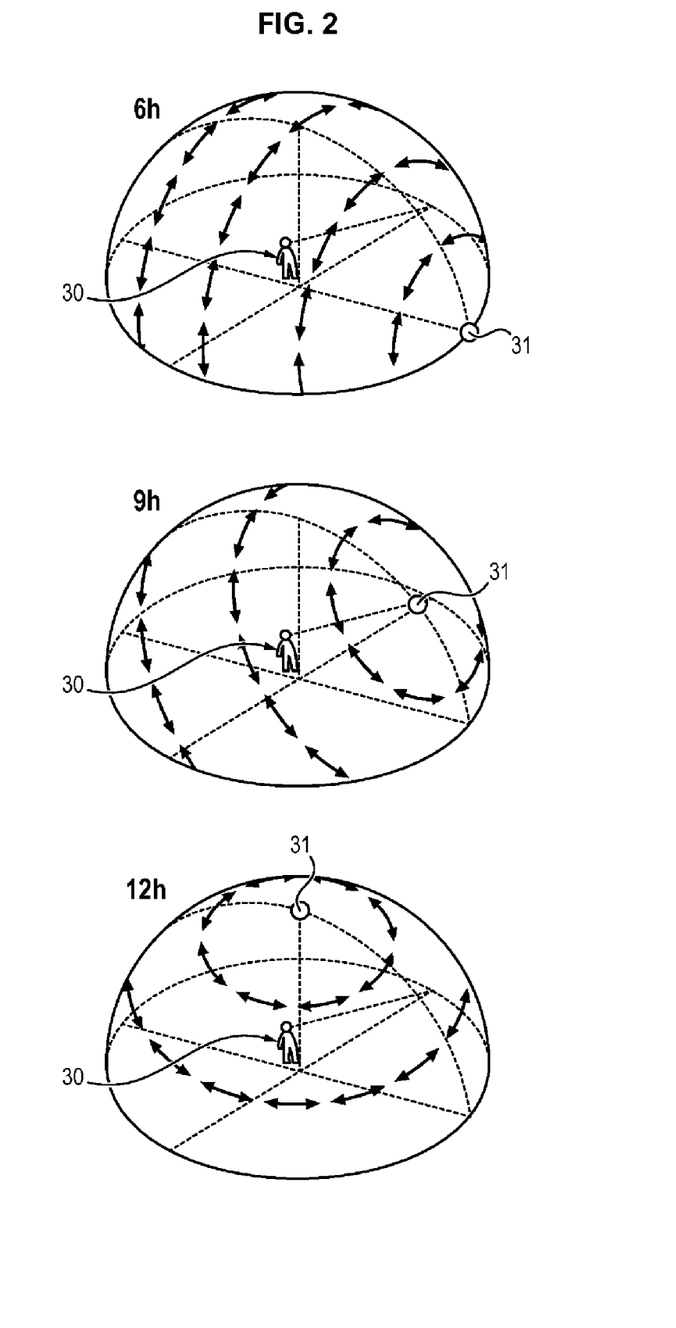
FIG. 2 is an illustration of the polarization field of the sky depending on the position of the sun relatively to a ground-based observer.

The direction of polarization of the light from the sky is then expressed in a deterministic way according to the angle between the target direction of the stellar sensor 1 with the direction of the sun. Indeed, as illustrated by FIG. 2, this direction is ortho-radial relatively to the target direction and the sun.

The degree of polarization (DOP, which defines the percentage of the light from the sky which is polarized), according to the Rayleigh model, has the expression:

$$DOP = \frac{\sin^2 \gamma}{1 + \cos^2 \gamma}$$

In this expression, $\gamma$ is the angle between the target direction of the stellar sensor 1 and the solar direction.

Therefore it is seen that the degree of polarization is maximum at 90° from the sun.

In FIG. 2, the polarization direction of the sky is illustrated as seen by a ground-based observer 30 at different times of the day (6 h, 9 h and 12 h). The position of the sun 31 is illustrated.

The control unit 4 is configured for controlling the orientation of the polarizer 5 so that said polarizer 5 filters the polarized light from the sky directed towards the camera 2 and having said polarization direction.

Thus, active control of the direction of the polarizer 5 is achieved by the control unit 4 according to the estimation of the polarization direction of the sky. This therefore gives the possibility of reducing the background noise of the sky.

Typically, the control unit 4 controls the direction of the polarizer 5 so that the latter has a direction orthogonal to the polarization direction of the polarized light from the sky received by the camera 2.

In an exemplary embodiment, the polarizer 5 is a rotating polarizer, which receives controls from a polarizer 5 controlled by the control unit 4.

Alternatively, it is possible to use the control unit 4 and the motor 33 for controlling the rotation of all or part of the elements of the stellar sensor 1 relatively to the polarizer 5.

By means of this configuration applying an active control, the sky background noise is better filtered, and this in an adaptive way.

It is desirable that the stellar sensor may take images regardless of the elevation and azimuth of the sun relatively to the vehicle having the stellar sensor loaded onboard.

Yet, a configuration with a single optical head cannot be suitable for all the pointing cases, because of the solar dazzling.

Therefore, in an embodiment, a configuration with at least two optical heads diametrically opposite in azimuth is applied.

Figure 3:
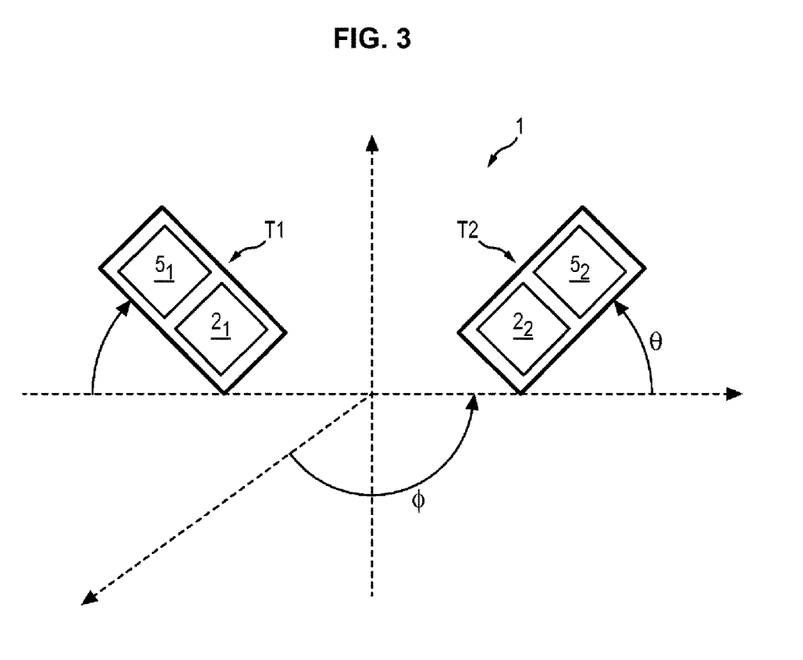
FIG. 3 is an illustration of an embodiment of a stellar sensor with several optical heads.

As illustrated in FIG. 3, the stellar sensor 1 has a first optical head T1, notably comprising a first camera $2_1$ and a first polarizer $5_1$. If necessary, the first optical head T1 comprises other elements as described with reference to FIG. 1 (filter, objective, etc.).

Further, the stellar sensor 1 comprises a second optical head T2, comprising a second camera $2_1$ and a second polarizer $5_1$.

A single control unit 4 may be used for controlling both polarizers $5_1$, $5_2$, via two actuators specific to each optical head T1, T2. Alternatively, a control unit 4 specific to each optical head T1, T2 is used.

The same applies relatively to the different measurement and processing means described with reference to FIG. 1 (inertial central unit, gyroscope, computer, etc.) which may be put in common for both optical heads, or specific to each optical head.

The first optical head T1 and the second optical head T2 are positioned diametrically opposite in azimuth (angle φ for the optical head T2 and −φ for the optical head T1, with for example φ=90°).

Further, the elevation angle θ of the optical heads (angle between the target axis of the heads and a horizontal axis) is generally identical and selected for minimizing the background noise of the sky.

Simulations have shown that the elevation angle θ should generally be selected between 20° and 70° in order to minimize the background noise of the sky, and preferably around 40°. Elevations greater than 70° are generally forbidden, since they cause dazzling of both optical heads at the zenith.

The simulations show that the signal-to-noise gain relatively to a stellar sensor without any polarizer with an active control is of the order of a ratio of three, which is considerable.

In the appendix (paragraph 4) a modelling of the number of stars seen by a stellar sensor of the prior art is provided according to different parameters. The stellar sensor according to the invention gives the possibility of substantially improving the number of stars seen by said stellar sensor relatively to the prior art, since it allows a more significant attenuation of the background signal from the sky as compared with the signal emitted by the stars.

1.2 Presentation of a Method for Taking Images of Stars

An embodiment of a method for taking images of stars in a daytime and nighttime period is described, applying a daytime and nighttime stellar sensor as described earlier.

Figure 4:
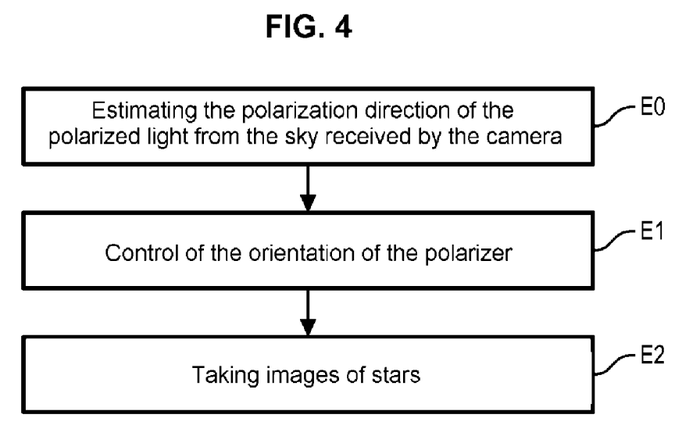
FIG. 4 is an illustration of an embodiment of a method for shooting images of stars.

As illustrated in FIG. 4, the method comprises a step E0 consisting of obtaining an estimation of a polarization direction of the polarized light from the sky received by the camera 2. This step is applied by the control unit 4 which calculates, from the angle between the target direction of the camera 2 and the sun, an estimation of a polarization direction of the polarized light from the sky received by the camera, for example on the basis of a Rayleigh model of the sky.

The method comprises a step E1 consisting of controlling the orientation of the polarizer 5 so that said polarizer 5 filters the polarized light from the sky directed towards the camera 2 and having said polarization direction.

For this purpose, the control unit 4 estimates the polarization direction of the polarized light from the sky, and orients, via the actuator 33, the polarizer 5 so that it filters the light having said direction. Generally, the control unit 4 orients the polarizer 5 orthogonally to said direction.

The control by the control unit 4 is generally accomplished in an open loop.

When the vehicle on which the stellar sensor 1 is moved, the control unit 4 adapts the orientation of the polarizer 5 to the estimation of the direction of the polarized light from the sky. Thus dynamic adaptation, if necessary in real time, is achieved.

2. Measurement of the Attitude of a Vehicle 2.1 Presentation of an Attitude Measurement Device of a Vehicle The measurements achieved by the stellar sensor 1 may notably be used in order to measure the attitude of a vehicle. Examples of relevant vehicles for example include: a drone, an aircraft, a balloon, a satellite, a ground-based vehicle, a marine vehicle, etc.

Thus, a device 12 for measuring the attitude of a vehicle includes the daytime and nighttime stellar sensor 1. It also comprises an inertial central unit 20, configured for providing an estimation of the attitude of the vehicle.

Alternatively, or additionally, the device 12 comprises a gyrometer 21. A processor 40 may notably achieve hybridization, for example via a Kalman filter, of the measurements of the inertial central unit 20 and of the gyrometer 21, in order to obtain an estimation of the attitude of the vehicle. This type of hybridization is known from the art.

The device 12 further comprises at least one memory 18 storing a catalogue 22 of known stars (i.e. for which the characteristics are known, like the position and the magnitude). The memory 18 and the memory 11 may, if need be, correspond to a single memory.

The comparison of the images taken by the stellar sensor 1 with the catalogue 22 of known stars gives the possibility of providing an attitude measurement, which is used by the device 12 for resetting the estimation of the attitude of the vehicle provided by the inertial central unit 20, or by the gyrometer 21, or by their hybridization.

2.2 Presentation of a Method for Measuring Attitude of a Vehicle

An embodiment of a method for measuring attitude (cf. FIG. 5) comprises the steps consisting of estimating the polarization direction of the polarized light from the sky received by the camera 2, and of taking images of stars 3 of the sky, according to steps E0, E1 and E2 described earlier.

Figure 5:
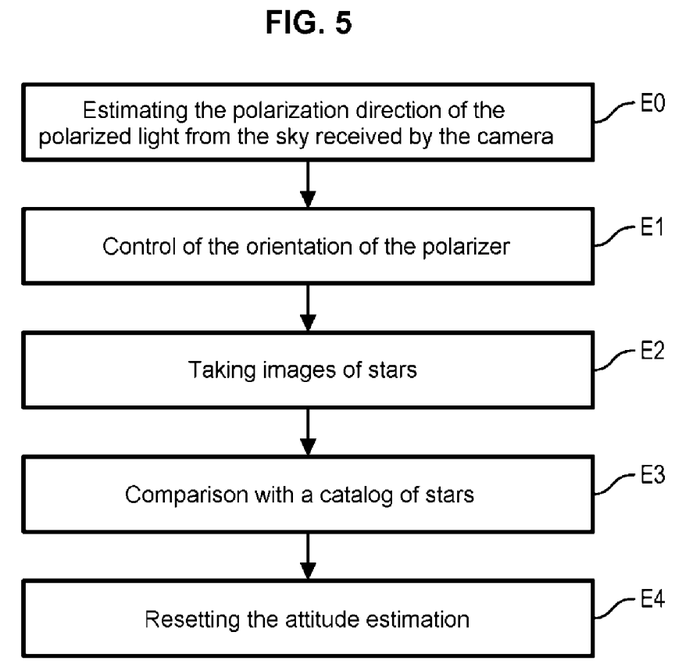
FIG. 5 is an illustration of an embodiment of a method for measuring the attitude of a vehicle.

A subsequent step E4 comprises the comparison of the images of the stars 3 with the catalogue 22 of known stars. This comparison is for example achieved by the computer 40.

This comparison gives the possibility of providing an attitude value, which is used for resetting the attitude calculated from measurements provided by the inertial central unit and/or the gyrometer. This resetting is typically achieved in the computer 40, which integrates into its filter the data produced by means of the stellar measurements.

In particular, the measurement biases caused by the measurement drift of the inertial central unit and/or of the gyrometer are reduced or even suppressed by means of this resetting.

As explained subsequently, it is advantageous to produce measurements in the infrared wavelength band, and in particular in the near infrared (between 0.9 μm and 2 μm), in order to allow daytime measurements at low altitude. In this case, the attitude of the vehicle is calculated in particular at low altitude, i.e. when the latter has an altitude comprised between 0 and 25 km.

3. Observation in the Near Infrared

The observation of stars, in particular in the daytime and at low altitude is complex to carry out.

The applicant has developed diverse configurations giving the possibility of optimizing this observation by means of analyses which he/she has carried out.

The stars are classified according to their spectrum class and to their luminosity class (classes I to VI, class III corresponding to Giants and class V to Dwarfs).

Figure 6:
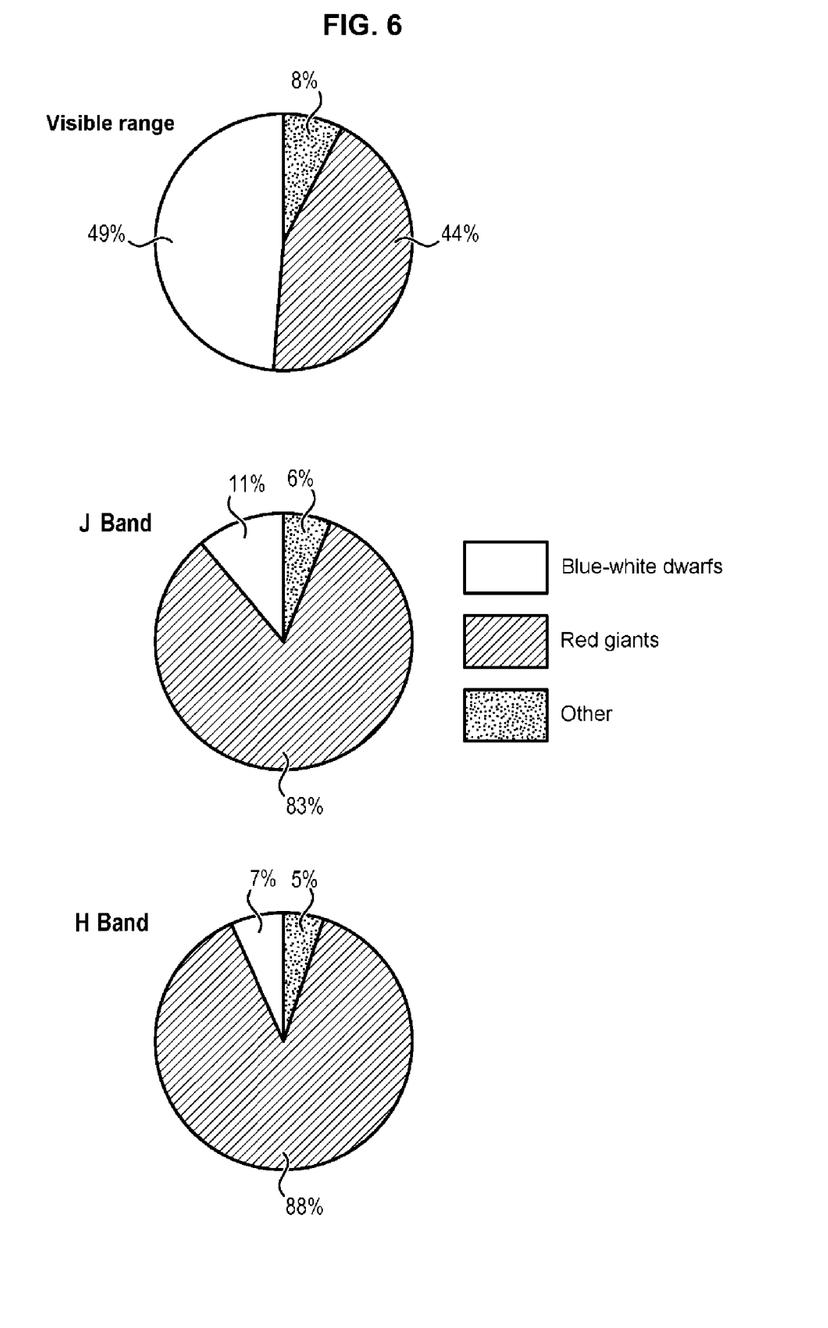
FIG. 6 is an illustration of a proportion of most visible star types based on observed spectrum bands.

The diagram in FIG. 6 illustrates the proportion of the most visible star types (from among the most visible 4,000 stars) depending on the observed spectrum bands. The band J (1 to 1.5 μm) and the band H (1.5 to 2 μm) belong to the near infrared.

The applicant has calculated, from satellite measurements, an empirical law giving the number of stars of a magnitude of less than m ($m_V$ for the visible domain, $m_J$ for the J band, and $m_H$ for the H band), for these different spectral bands.

| | Band | | |
|---|---|---|---|
| | Visible | Band J | Band H |
| Number of stars | $N_V = 5.1310^{0.50\ m_V}$ | $N_J = 57.010^{0.50\ m_J}$ | $N_H = 150.010^{0.48\ m_H}$ |

It is therefore seen that the magnitude development law has a development similar in the three ranges of wavelengths (when one increases by one magnitude unit, the number of stars is multiplied by about 3).

But, at equal maximum magnitude, the number of stars in the J and H bands is about 11 to 29 times greater than in the visible band.

Therefore, in an embodiment, the stellar sensor 1 further comprises at least one optical light filter 7, exclusively letting through the light in the infrared band.

More particularly, in an embodiment, the light filter 7 exclusively lets through the light having a wavelength comprised between 0.9 μm and 2 μm (near infrared).

More particularly, in an embodiment, the light filter 7 exclusively lets through the light having a wavelength comprised between 1.5 μm and 2 μm and/or between 0.9 μm and 1.4 μm. The "hole" voluntarily left between 1.4 μm and 1.5 μm corresponds to the water absorption band, which makes the atmosphere opaque in this band.

These spectral bands give the possibility of increasing the signal-to-noise ratio and allowing daytime measurements at low altitude.

An example of a camera which may operate in the bands of the near infrared is a camera 2 based on InGaAs.

The main benefits from operating in the near infrared, relatively to visible light, are notably the following:
- a reduced sky background noise (because the Rayleigh effect varies as $1/\lambda^4$);
- an abundance of stars of the "red giants" type;
- good spectral response of detectors of the InGaAs type;
- a "full well capacity" ("FWC") of said detectors.

A camera 2 which comprises a detector of the InGaAs type (0.9-1.7 μm), with a matrix of 640×512 pixels of 25 μm, is suitable for altitudes of the order of 10 km. If it is desired to go below sea level, a matrix of at least 1 million pixels of 25 μm fits the need.

If the camera 2 observed wavelengths in the visible light, it would not be possible to observe stars during daylight period and at a low altitude, except by:
- using very large detectors of several tens of millions of pixels;
- increase the surface well depth by a very large factor;
- carry out summation of images, i.e. of several tens of images. This will prove to be difficult if the vehicle is moving with a strong angular kinematics (rapid rotation).

The table below compares the solution in visible light (comprising a camera based on silicon) with the solution in the near infrared (comprising a camera based on InGaAs).

| | Visible (Silicon) | Near infrared (InGaAs) |
|---|---|---|
| Size of each pixel (μm) | 4 to 7 | 25 |
| Max number of pixels | ~10 to 20 millions | ~0.3 million |
| Detector size (mm) | 18 to 36 | 15 |
| Surface FWC | 400 | 3,000 to 4,000 |

The invention finds many applications in the imaging of stars, in particular for purposes of measuring and resetting attitude, for daytime and nighttime periods, even at low altitude.

4. Appendix

The number of stars $N_e$ of a magnitude less than m as seen by a stellar sensor of the prior art may be modeled by the following formula:

$$N_e = \frac{\pi^{0.25}}{16} N_B \left( \frac{T_a P_0}{L(h) S_b I_B} \right)^{1.25} N_{tot} f_p^{0.75} (rp)^{0.625} f^{0.5}$$

In this formula:
- $N_B$ depends on the density of stars present in the sky in the relevant spectral band (examples: visible, $N_v \sim 5$; J band, $N_j \sim 57$; H band, $N_h \sim 150$);

$P_0$ depends on the Vega signal in the relevant band;

$T_a$ is the atmospheric transmission;

$I_B$ is the background fraction of the sky collected in the spectral band;

The value L(h) is given by molecular diffusion, and depends on the altitude h, on the elevation and on the angle to the sun. However, this value does not depend on the spectral band (the spectral effect being integrated in the variable $I_B$);

$S_b$ is a signal-to-noise constant. An order of magnitude of this value for optimizing the detection probability is from 25 to 30.

$Nt_{ot}(=N_x \cdot N_y)$ is the total number of pixels of the detector (number of pixels per line $N_x$ multiplied by the number of pixels by column $N_y$).

$L_p$ is the size of one side of a pixel;

rp is the well depth per unit surface (unit: e–/m$^2$);

f is the focal length.

For a given detector, the number of stars increases with the number of pixels, decreases with the square root of the field. For a constant aperture number, the number of stars increases with the square root of the size of the objective (monodimensional).

If we replace L(h) with its expression towards the altitude, we obtain:

$$L(h) = Ke^{-h/7.5},$$

with K being a constant.

The number of stars therefore changes with the altitude according to the law:

$$N_e \propto e^{1.25h/7.5} = 2^{\frac{h}{4.2}}$$

The number of detectable stars doubles every about 4.2 km.

The stellar sensor according to the invention gives the possibility of substantially improving the number of stars seen by said stellar sensor as compared with the prior art, since it allows a larger attenuation of the background signal of the sky relatively to the signal emitted by the stars: the star signal is more increased than the sky background signal is lowered.

The invention claimed is:

1. A daytime and nighttime stellar sensor, comprising:
   at least one camera adapted for taking images of stars of the sky,
   a control unit,
   characterized in that it further comprises:
   a polarizer,
   the control unit being configured for:
   obtaining an estimation of a polarization direction of the polarized light from the sky received by the camera, and
   controlling the orientation of the polarizer so that said polarizer filters the polarized light from the sky directed towards the camera and having said polarization direction.

2. The stellar sensor according to claim 1, further comprising a light filter, exclusively letting through the light in the infrared band.

3. The stellar sensor according to claim 2, wherein the light filter exclusively lets through the light having a wavelength comprised between 1.5 μm and 2 μm or between 0.9 μm and 1.4 μm.

4. The stellar sensor according to claim 1, comprising a device for measuring an angle between a target direction of the stellar sensor and the sun, the control unit being configured for estimating the polarization direction of the polarized light from the sky received by the camera from said angle.

5. The stellar sensor according to claim 1, wherein the control unit comprises a memory storing ephemerides and/or a solar direction model for calculating an angle between a target direction of the sensor and the sun, from which the control unit calculates the polarization direction of the polarized light from the sky received by the camera.

6. The stellar sensor according to claim 1, comprising:
   a first optical head, comprising a first camera and a first polarizer, and
   a second optical head, comprising a second camera and a second polarizer,
   the first optical head and the second optical head being positioned in a diametrically opposite direction in azimuth.

7. A device for measuring the attitude of a vehicle, comprising:
   an inertial central unit and/or a gyrometer, for providing an estimation of the attitude of the vehicle,
   characterized in that the device further comprises:
   a daytime and nighttime stellar sensor according to claim 1,
   a memory storing a catalogue of known stars,
   the device being configured for resetting the estimation of the attitude of the vehicle provided by the inertial central unit and/or by the gyrometer from images taken by the stellar sensor and from the catalogue of known stars.

8. A vehicle, characterized in that it comprises a device for measuring attitude according to claim 7.

9. A method for taking images of stars in a daytime and nighttime period, applying a daytime and nighttime stellar sensor comprising a camera and a polarizer, characterized in that it comprises steps consisting of:
   controlling the orientation of the polarizer so that said polarizer filters the polarized light from the sky directed towards the camera and having said polarization direction,
   taking images of stars of the sky with the camera.

10. A method for measuring the attitude of a vehicle, comprising the steps consisting of:
    taking images of stars of the sky according to the method of claim 9, exclusively in a wavelength band comprised between 0.9 μm and 2 μm,
    comparing the images of the stars with a catalogue of known stars, for resetting an estimation of the attitude of the vehicle when the latter has an altitude comprised between 0 and 25 km.

* * * * *